United States Patent [19]
Hawkins

[11] 3,830,616
[45] Aug. 20, 1974

[54] MEANS FOR MOLDING ARTICLES OF THERMOPLASTIC SHEET MATERIALS

[75] Inventor: Carl J. Hawkins, Toledo, Ohio

[73] Assignee: Rowe Industries Division of Coleman Cable & Wire Company, Toledo, Ohio

[22] Filed: July 3, 1972

[21] Appl. No.: 268,879

[52] U.S. Cl. .............. 425/384, 425/388, 425/450, 425/143
[51] Int. Cl. .......................................... B29c 17/04
[58] Field of Search .......... 425/384, 388, 450, 143, 425/324; 264/92, 89

[56] References Cited
UNITED STATES PATENTS

| | | | |
|---|---|---|---|
| 2,496,014 | 1/1950 | Myers | 425/384 X |
| 2,694,227 | 11/1954 | Fordyce et al. | 425/388 X |
| 2,926,385 | 3/1960 | Wilson, Jr. | 425/388 X |
| 3,041,669 | 7/1962 | Marshall et al. | 425/388 X |
| 3,137,747 | 6/1964 | Kline | 425/388 X |
| 3,258,813 | 7/1966 | Groth et al. | 425/324 X |
| 3,368,243 | 2/1968 | Kohen | 425/388 |
| 3,476,377 | 11/1969 | Agrista et al. | 425/388 X |
| 3,496,143 | 2/1970 | Siggel et al. | 264/92 X |
| 3,646,190 | 2/1972 | Spyra | 264/92 X |
| 3,687,594 | 8/1972 | Medendrop | 425/388 |
| 3,737,496 | 6/1973 | Voorhees, Sr. | 425/388 X |

*Primary Examiner*—Robert L. Spicer, Jr.
*Attorney, Agent, or Firm*—Charles F. Schroeder

[57] ABSTRACT

Method and apparatus for molding three dimensional articles of thermoplastic sheet material which after molding will withstand the high temperatures of autoclaving for sterilization in hospital use without distortion. Molding is accomplished by providing a low mass mold made of sheet metal which has low heat sink characteristics and is adapted to providing a high degree of temperature uniformity by being made of substantially uniform thickness high thermal conductivity material heated by convection hot air means for a preselected dwell time with the consequent attainment of thermal stability during formation of the article.

7 Claims, 8 Drawing Figures

Fig. 2

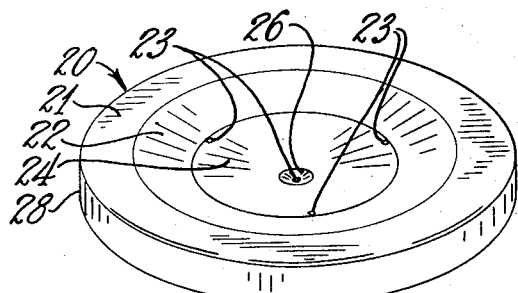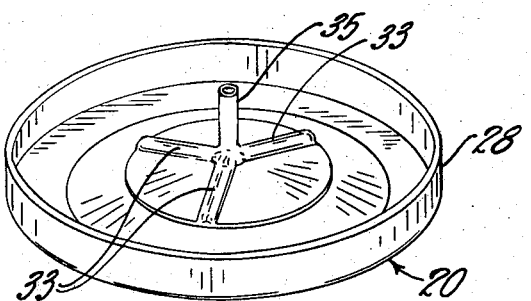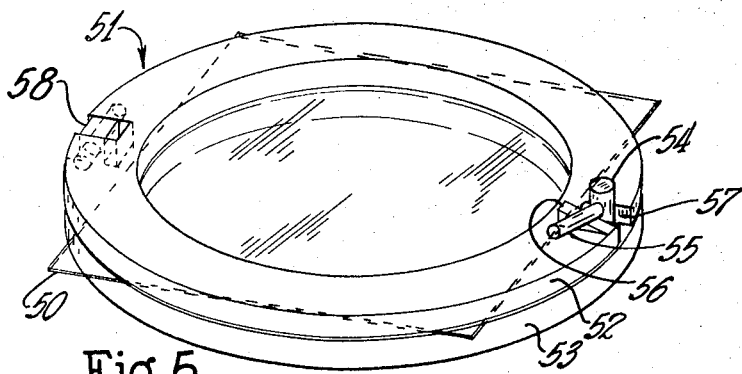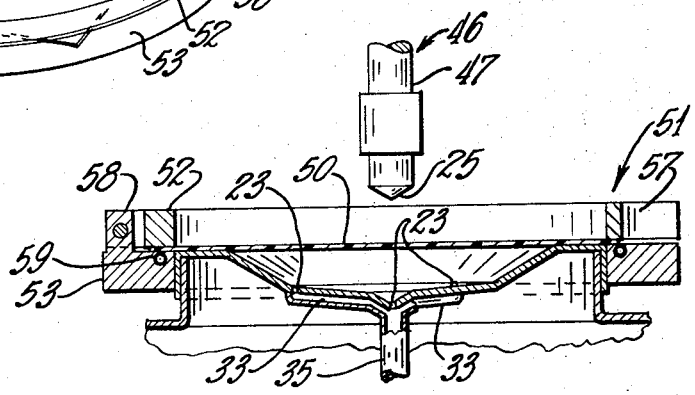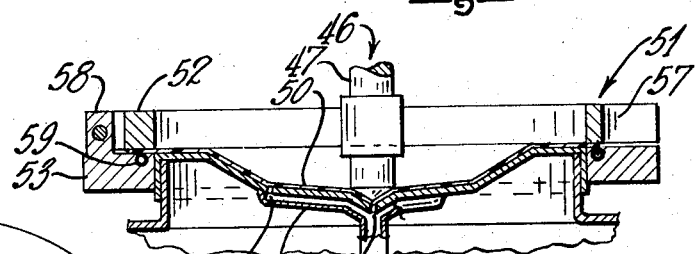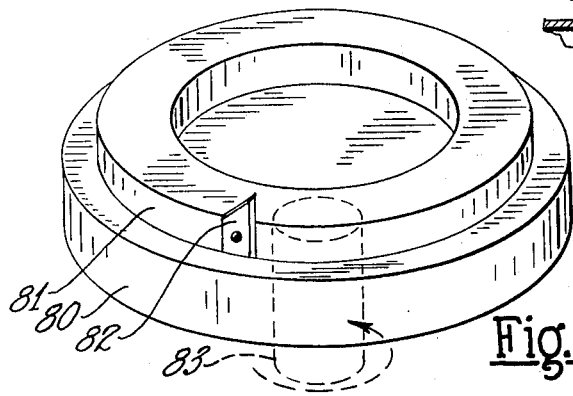

MEANS FOR MOLDING ARTICLES OF THERMOPLASTIC SHEET MATERIALS

This invention relates to a method and apparatus for molding three dimensional articles of thermoplastic sheet material and more particularly to molding such articles with an imparted dimensionally stable condition capable of withstanding relatively high temperatures such as temperatures of autoclaving specified for sterilization of articles in use for hospital patient care.

In molding articles of thermoplastic sheet or film material such as polyester film commercially available under the name Mylar, a trademark of E. I. duPont deNemours & Co., Inc., it has been found that although shaping can be accomplished under the influence of heat and pressure, both the sequencing of the cycle of temperature application and the manner of application of heat to the material are important in the attainment of precision and dimensional stability in use of the product under normal environmental conditions and even more so under the temperatures of autoclaving in the order of 240° F. and 260° F. Dimensional stability and precision of form prove especially necessary in articles such as vibrating elements of high frequency appliances such as nebulizers wherein high frequency mechanical energy is transferred by way of such three dimensional vibrating elements to liquid medication to be nebulized. Energy transfer and efficiency of operation of the apparatus is greatly diminished upon even slight warpage such as can frequently occur at high autoclaving temperatures with consequent less predictibility in meeting prescribed operational needs.

In view of the foregoing it is the object of the present invention to provide a method and apparatus for producing articles of thermoplastic material such as Mylar which will be able to withstand the high temperatures in the order of 240° F. to 260° F. without distortion.

Another object of the invention is to provide a method and apparatus for producing a dimensionally stable article of thermoplastic sheet material with minimum internal stress and corresponding minimum tendency toward distortion.

A further object of the invention is to provide a method and apparatus for producing a stable precision dimensioned article of thermoplastic sheet material which after formation is capable of withstanding high temperature autoclaving conditions without the memory of the material causing distortion by reason of its tendency to return to its original planar condition.

A still further object of the invention is to provide a method for rapid molding of thermoplastic sheet or film material into three dimensional articles having minimum internal stress tendencies toward warpage.

Another object of the invention is to provide apparatus for reliably molding thermoplastic sheet or film material into a three dimensional article, such apparatus being simple in construction, relatively low in cost and flexibly adaptable to precise cyclic sequencing depending upon the product to be molded.

In brief, these objectives are met according to the present invention by making the base of the contoured shaping surfaces of the mold relatively thin such as of sheet metal which can be inexpensively shaped to desired form. Further rather than needing to rely upon the heat sink characteristics of a massive mold for uniformity of temperature it has been found that a high degree of uniformity of temperature throughout the mold can be attained by utilization of air convection heating means and by making the mold of material having a high thermal conductivity such as copper, aluminum or silver. The invention, therefore, involves utilization of a mold made of thin sheet metal having a high thermal conductivity which because of its thinness is inexpensively formable to desired shape and which can be efficiently heated uniformly throughout to attain the desired high dimensional stability in the molded product by convection heating techniques which might ordinarily be considered inefficient for molding operations.

A feature of the invention lies in the thin dimension of the mold which makes it readily formable of sheet material itself by simple forming techniques such as punching or pressing. Thinness of the mold results in its mass being small with corresponding small heat sink characteristics.

Another feature of the invention is that thinness, substantial uniformity of thickness and high conductivity of the mold, besides making it possible to rapidly increase the mold temperature uniformly throughout, also permits rapid sequencing through heating and cooling steps as well as corresponding close control of the molding cycle.

Still another feature of the invention lies in the fact that the mold, in being of small mass, is readily adapted to rapid heating and cooling with fluid such as by direct convection heating and cooling with air. Also, because the mold is of small mass little of the convected heat is absorbed thereby with the result that heat transmission and absorption to and from the sheet material can be accomplished readily with the result that it acts somewhat as if it were transparent to heat and air convected heat can be communicated more directly to material in communication with the shaping surface of the mold.

Other objects and features which are believed to be characteristic of may invention are set forth with particularity in the appended claims. My invention, however, both in organization and manner of construction, together with further objects and features thereof, may be best understood by reference to the following description taken in connection with the accompanying drawings in which:

FIG. 3 is a perspective view of the upper and material shaping surface of the mold member of the apparatus of FIG. 2;

FIG. 4 is a perspective view of the underside of the mold of FIG. 3;

FIG. 5 is a perspective view of a clamping frame for mounting the thermo-formable sheet material over the mold of the apparatus of FIG. 2 during shaping of the articles according to the present invention;

FIG. 6 illustrates in cross-section the sheet clamping frame of FIG. 5 resting in position over the mold of FIG. 2 before shaping of the sheet material;

FIG. 7 illustrates in cross-section the sheet clamping frame of FIG. 6 with the heated sheet material vacuum drawn and pressed into communication with the molding surface;

FIG. 8 is a side elevational view of a jig for cutting the shaped article of FIG. 1 from the sheet material held in the clamping frame of FIG. 5.

Figures 1, 2:
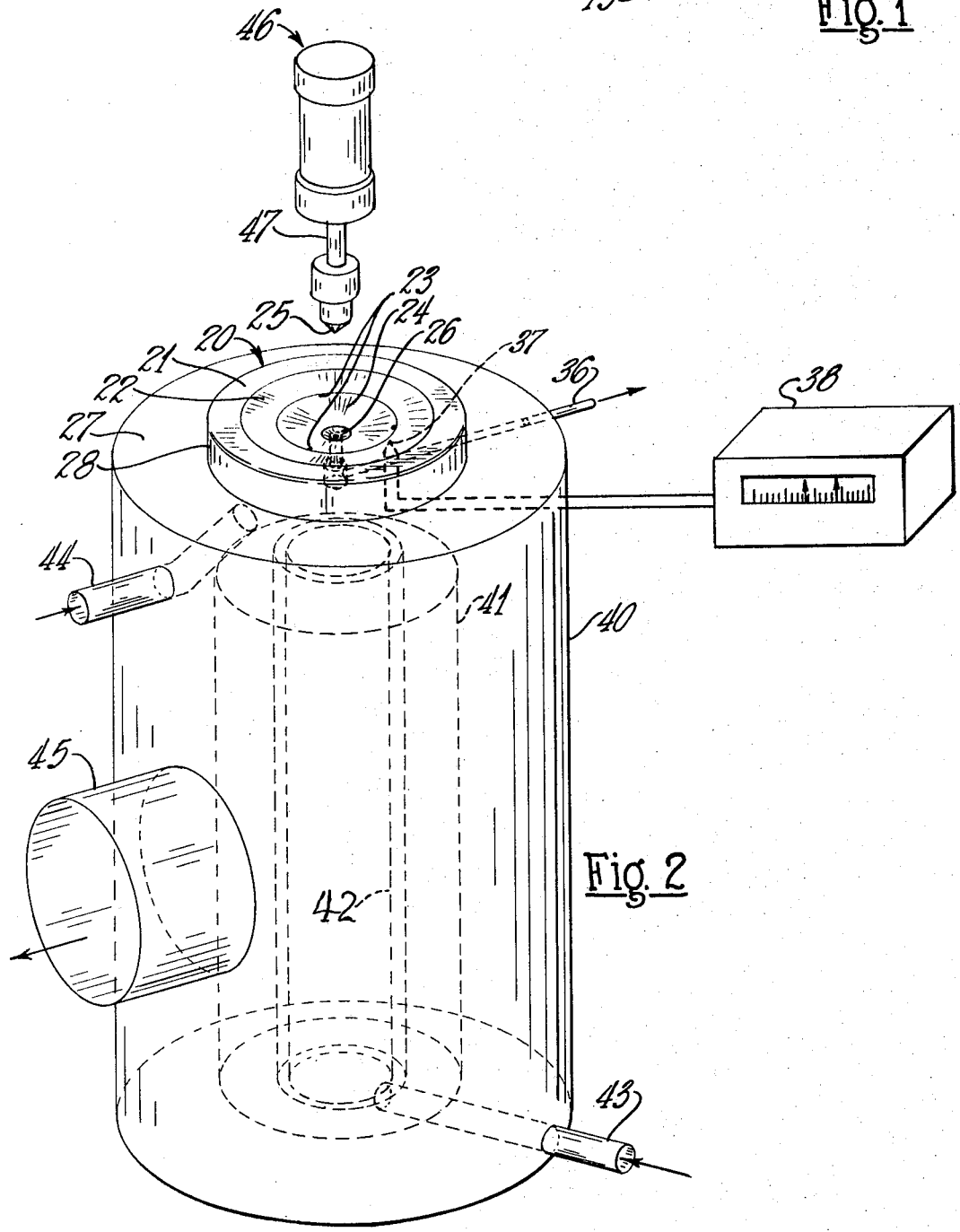
FIG. 1 is a perspective view of a three dimensionally shaped container or thermoplastic vibratable disk element representing articles which may be made of thermoplastic sheet material by the method and apparatus of the present invention.
FIG. 2 is a side elevational view in perspective of apparatus embodying the principles of the present invention whereby thermoplastic sheet material can be molded to three dimensional shape and provided a high degree of thermal stability.

Referring to the drawings in greater detail, FIG. 1 illustrates a vibratable element and/or medication containing element 10 representative of the type of three dimensional articles which can be molded of thermoplastic or thermo-formable sheet material such as polyester sheets or film according to the concepts of the present invention. The shaped article 10 as illustrated has an outer slightly inclined ridge 11 extending from its outer circumference and merged on its inner edge with a second region 12 of greater downward inclination toward the center. The second region 12 in turn is merged with a more central third inclined region 14 which is terminated at a central depression 15 of the article.

Although specifically described and illustrated, it is submitted that the article described and shown is merely representative of any number of three dimensional shaped articles which are desirably produced of thin sheet or film of thermoplastic materials. In particular according to this invention, the article holds its shape over a wide range of temperatures and in many instances this shape retention is of considerable importance in effecting functional results in equipment with which they are associated, for example, such as for transmission of high frequency vibratable energy for conditioning or modification of the liquid such as medication which may be contained or brought in communication therewith. High temperature plays an important part in use of such elements for hospital purposes in that regulations most often specify that such elements must be subjected to autoclaving for sterilization before and after each use in patient care.

FIG. 2 illustrates the apparatus of the present invention wherein a shaped mold member 20 made of sheet metal is mounted over an opening in the upper surface 27 of housing 40 or an air chamber with which the underside of the mold member 20 is in communication. The underside of the mold 20 thus is exposed to hot and cold air which may be alternately introduced into the air chamber. In this regard air is introduced to the chamber under pressure by way of an inlet 43 at the bottom of the chamber from ordinary pressure sources such as an air supply line at pressures, for example, in the order of 40 to 60 psi. The air is ejected from the inlet 43 into a central shroud 41 aligned directly under the mold 20 to provide a path for the air to the underside of the mold. Electric resistance heating element 42 are disposed within the shroud to heat the air prior to its being brought into communication with the underside of the mold. The heating element 42 may be any of a number of heating devices including radiant burners, heating strips and electric radiant coils and in this regard the showing is merely illustrative of any of a number of means for heating atmospheric air in a relatively small zone. An exhaust outlet 45 in the sidewall of the air chamber 40 permits release of the air after communication with the mold.

Cooling air is brought into the chamber 40 by way of an inlet 44 directed upwardly in the region adjacent the heated air shroud 41 so that it may be brought into communication with the underside of the mold in periods alternating with the periods of direction of hot air thereagainst. Thus both hot and cold air may be directed to the underside of the thin mold to effect a heating or cooling of the member more uniformly in cyclic sequence as desired.

The fact that the mold 20 itself is thin and not a conventional more massive cavity mold permits adoption of the otherwise usually ineffective convection heating technique. That is, convection heating is usually not considered efficient for mold heating but by making the mold thin such as of sheet metal, and particularly of a material of a high thermal conductivity such as copper, the heat sink characteristics of the mold are low and the uniformity of distribution of heat transmitted thereto is additionally assured by reason of the conductivity of the material. Because of these characteristics, the mold in a sense might be considered transparent to heat and the material disposed above and in communication with the mold can be rapidly heated by the hot convection air currents below.

The apparatus illustrated in addition includes an auxiliary male mold unit 46 to assist in shaping intricate details of the formed article such as the center of depression 15 which is shaped by pressing the male mold portion 25 mounted on the axially moveable shaft 47 into communication with the sheet material upon which the sheet is vacuum or suction drawn into communication with the mold cavity arrangement illustrated in greater detail in FIGS. 3 and 4. By way of example the pressure applied to the male mold 25 may be supplied by a solenoid released weight associated therewith or by fluid pressure such as by a pneumatic actuated piston in the head of the unit 46. The female mold portion 20 is contoured to conform to the conical element 10 of FIG. 1 and in this regard is has an outer slightly inclined ridge 21 merging with an inner second inclined ridge 22 extending to third more central region 24 and a central depression 26 shaped for cooperative molding of the central region of the article 10 with the male mold member 25 when it is brought into pressure communication with the sheet material drawn into the mold cavity.

FIG. 3 illustrates with greater clarity the distribution of the suction apertures 23 through which air under the sheet material is withdrawn to effectively bring the sheet material into communication with the shaped regions of the mold cavity.

FIG. 4 shows a main suction tube 35 centrally located on the other side of the mold and communicating with three air suction branches 33 communicating with the apertures 23 disposed about the center of the cavity at the line of merger between the inclined regions 22 and 24. In addition an aperture 23 is provided in the central depression 26 of the mold. The mold cavity itself may be provided with a mounting flange 28 as an integral part thereof or alternately may be mounted over the flange 28 which might be an integral part of the housing for the air chamber if desired and where it proves convenient to advantageously shape the mold without such a flange.

FIG. 5 discloses a clamping frame 51 of the type which may be used to hold the sheet material in place as the article of FIG. 1 is being formed in the mold. Two matched annular clamping rings 52 and 53 are provided with a joining hinge 58 at one side, permitting the clamping structure to be swung open for insertion of a blank of sheet material 50 for heating and shaping. Locking pin 55 on an arm 54 extending from the clamping ring 53 through a cutout 57 in the clamping ring 52 can be rotated to engage a locking wedge 56 on the upper surface of the ring 52, thereby permitting a tight clamping of one clamping ring of the frame against the other to hold the material therebetween. An O-ring 59 fixed in the bottom-most ring 53 facilitates a tight engagement of the sheet material 50 without slippage about its periphery.

FIG. 6 shows the manner in which the clamping frame 51 is rested in snug-fit relation over the shaped surface of the mold 20 preparatory to shaping of the sheet material 50 therein. Shaping of the material is accomplished by heating the mold and material to a predetermined temperature to soften the material whereupon the plastic sheet can be drawn into the shaped surface by withdrawing air from underneath through the mold apertures 23 connected by way of the air suction passages 33 to the main suction tube 35. Suction forces may be supplied by any of a number of conventional means and, depending upon the number of mold units in production, such suction may be established by a main pump associated with a distribution system for establishment of reduced pressure for withdrawal of air from any of a number of mold units.

FIG. 7 shows the sheet material 50 of FIG. 6 after it has been drawn down into the shaping surfaces of the mold upon withdrawal of air from under the sheet. Since the central depression 26 of the mold is somewhat small and intricate, the shaping of this region is assisted by the male mold member 46 brought into pressure engagement with the sheet material to press it into the small dimpled region. Such auxiliary assist of shaping with a male mold member is intended to be exemplary in this arrangement in that either one or a number of auxiliary assist mechanisms of different shape may be utilized in the same manner to impart an intricate shape to the sheet material drawn into the mold. For example, a plurality of dimples, or alternately, embossments might be impressed in the shaped material, or an entire matching male mold member might be used to assist in such shaping. The overall major shaping is accomplished herein, however, by bringing the sheet material into communication with the shaping surfaces such as by vacuum drawing, and heating the material for a dwell time sufficient to establish the dimensional stability desired.

A thermocouple 37 for measuring the mold temperature, as may be seen more clearly in FIG. 2, may be secured in contact with the underside of the mold 20 at a point between its central region and outer edge. The thermocouple can be connected to a direct reading galvametric indicator 38 such as may be commercially obtained with a temperature selection for automatic regulation of the mold at a preselected temperature and which may be used to regulate the hot air flow to the underside of the mold 20. Since as hereinabove indicated the mold is made of material of high thermal conductivity, and the mold in being thin, has low heat sink properties, the point contact measurement of temperature by the thermocouple is rapidly and accurately representative of the overall temperature of the mold. The mold cycle thus may be precisely controlled to assure the optimum conditions for production of the desired dimensionally stable article.

Although the invention has been described in relation to production of a product of highly heat stable character, it will be recognized as also generally adaptable to forming articles of any of a number of film and sheet materials such as polyesters, fluoroplastics, nylon, polycarbonate, vinyl, polyethylene, polystyrene and polyvinyl chloride. More specifically representative of the method of the invention in producing a heat stable product, and by way of example without intent to be limiting, a preshrunk stabilized polyester film such as polyethylene terapathalate commercially available as preshrunk Mylar has been found to provide excellent products with high temperature dimensional stability.

In this regard, a sheet or film of this type having a thickness in the range of 2 to 6 mills secured in the clamping frame 51 can be placed over the mold which is brought up to a uniform forming temperature of 450° F. Raising the temperature of the sheet to excess causes disruption of its form and flow of the material and accordingly it is desirably brought close to but maintained at a forming temperature below this condition. The film may be drawn into the cavity of the mold 20 under a negative pressure of 26 inches on the male mold member 25 and held there for 12 seconds as convection heating of the mold continues. Flow of convection heating air is then halted and cooling air is supplied thereto to cool the mold as rapidly as possible. The forming temperature should be above the temperature at which the final article is to maintain its dimensional stability and the dwell time to attain such stability can be determined by trial. Products of the desired dimensional stability at autoclaving temperature of 260° F. have been produced in this manner by heating the sheet material to 450° F. in 30 to 38 seconds and maintaining it at this temperature for 12 seconds and then cooling the mold and material over a period of about 30 seconds. Although the soaking or dwell time is important to establish the desired heat stability in the shaped final product, cooling time is not found to be critical, and cooling such as by convection can be effected as fast as possible without concern for criticality. In this regard refrigerated gas might be utilized to accelerate the cooling. Sheet material up to one-eighth inch thickness and more may be successfully shaped in this way dependent upon the mold shape and the forces necessary to bring the sheet material into communication with the shaping surfaces of the mold. Thus, the thin mold as well as the thin sheet material makes possible fast heat build-up and rapid heat loss by forceful cooling.

After cooling of the thermo-formed article, it is ready to be severed from the marginal regions of the sheet 50 secured in the clamping frame 51. This can be readily accomplished by removing the clamp and formed product from its rested position over the mold 20 and placing it instead over the cutting jig 80 shown in FIG. 8. The outer diameter of the ridge 81 of the jig is such that it fits snugly into the inner region of the clamping frame 51 and a cutting blade 82 projecting above the upper surface of the ridge 81 makes cutting engagement at a point at the outer edge of the product so that upon effecting relative rotation between the frame and jig, the product is readily cut from the marginal regions of the material clamped in the frame 51. Relative rotation may be imparted either by rotating the jig by way of its support shaft 83, while the frame 51 is held thereover, or by rotating the frame over the jig in stationarily mounted position.

After being cut from the sheet material as well as after autoclaving of the element 10 of FIG. 1, it may be checked with a dial indicator for warpage in a jig material in general contour thereto. Deviations in height of the outer flange of more than plus or minus 5 mills have been considered out of specification and not acceptable. By forming the article as herein set forth, however, it is found that very few if any in a hundred are not acceptable after formation, and relatively few are not acceptable after being thermally treated under standard autoclaving conditions meeting hospital care requirements.

It will be understood that many variations of the method and apparatus of the present invention can be provided within the broad scope of the principles embodied therein. For example, the heating fluid for the thin mold might be hot oil sprayed or flowed on the underside of the mold although less easily handleable. Thus, while a particular preferred embodiment of the invention has been shown and described, it is intended by the appended claims to cover all such modifications which fall within the true spirit and scope of the invention.

I claim:

1. Apparatus for molding thermo-formable sheet material into three dimensional articles comprising, a mold having a cavity on one side conforming in shape to the article to be formed, means for flowing heated gas in direct communication with said mold on the side of said mold opposite said cavity effective to heat said mold by convection to a preselected temperature substantially throughout, means for bringing and holding said sheet material in heat conductive communication with the heated cavity surface of said mold as convection heat is continued to be supplied to said opposite side for a predetermined dwell period for dimensional stability, and means for forcefully cooling the article in said mold.

2. Apparatus according to claim 1, wherein the mold is of uniform thickness and made of material of high thermal conductivity.

3. Apparatus according to claim 2, wherein the mold is made of sheet metal selected from the group of copper, aluminum and silver.

4. Apparatus according to claim 1, wherein the means for bringing and holding said sheet material in communication with the heated cavity surface of the mold comprises pneumatic negative pressure means connected to at least one aperture suitably located in the cavity surface of said mold.

5. Apparatus according to claim 4, wherein the means for bringing and holding said sheet material in communication with the heated cavity surface of the mold includes a clamping means for securing said sheet meaterial over the mold cavity in the region of the perimeter of the article to be formed.

6. Apparatus according to claim 1, wherein the means for forcefully cooling the article in said mold comprises means for blowing convection cooling gas at the major surface of the mold opposite said cavity.

7. Apparatus according to claim 6, wherein the convection cooling means includes means for cooling the convection cooling gas below atmospheric temperature.

* * * * *